April 13, 1965   G. F. HARPELL   3,178,566
FUNCTION GENERATOR
Filed Feb. 12, 1962   4 Sheets-Sheet 1
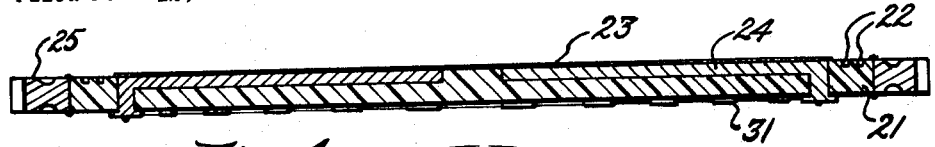
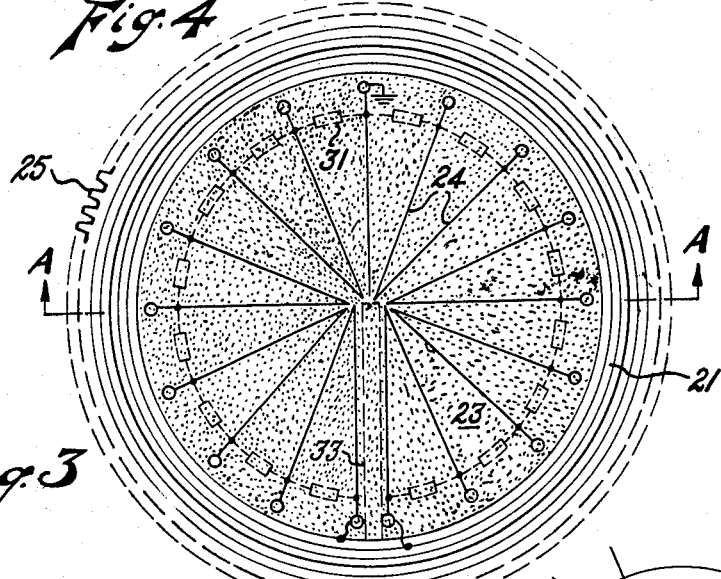
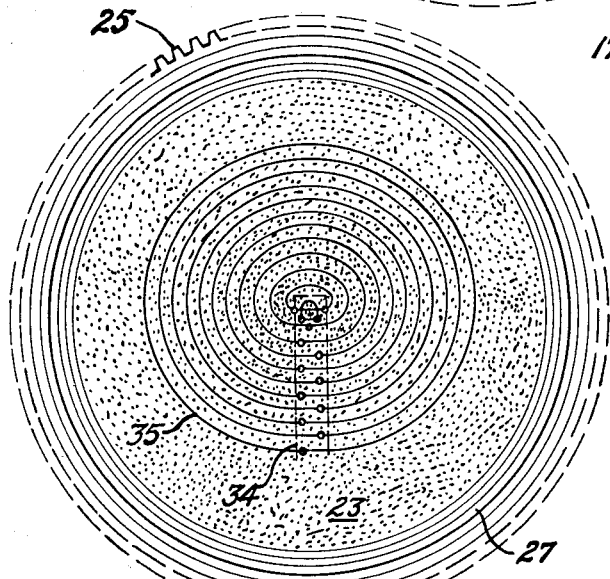
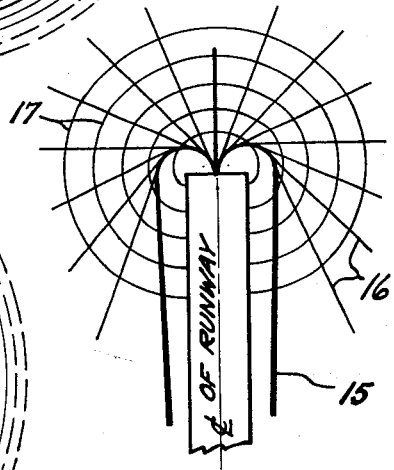
INVENTOR.
GEORGE F. HARPELL
BY
ATTORNEYS April 13, 1965  G. F. HARPELL  3,178,566
FUNCTION GENERATOR Filed Feb. 12, 1962  4 Sheets-Sheet 2

INVENTOR.
GEORGE F. HARPELL
BY
ATTORNEYS

April 13, 1965 G. F. HARPELL 3,178,566
FUNCTION GENERATOR
Filed Feb. 12, 1962 4 Sheets-Sheet 3

INVENTOR.
GEORGE F. HARPELL
BY
ATTORNEYS

April 13, 1965 G. F. HARPELL 3,178,566
FUNCTION GENERATOR

Filed Feb. 12, 1962 4 Sheets-Sheet 4

$R_x = R_{c_4} \| R_{L_4} = 500$ OHMS

INVENTOR.
GEORGE F. HARPELL
BY
ATTORNEYS

United States Patent Office 3,178,566
Patented Apr. 13, 1965

3,178,566
FUNCTION GENERATOR
George F. Harpell, Concord, Mass., assignor to the United States of America as represented by the Secretary of the Air Force
Filed Feb. 12, 1962, Ser. No. 172,833
9 Claims. (Cl. 235—197)
(Granted under Title 35, U.S. Code (1952), sec. 266)

The invention described herein may be manufactured and used by or for the United States Government for governmental purposes without payment to me of any royalty thereon.

This invention relates generally to navigational computation, and more particularly to a system for controlling aircraft in accordance with predetermined flight patterns.

It is a primary object of this invention to provide an improved aircraft control system whereby such aircraft may be effectively controlled in accordance with a predetermined flight pattern.

It is a further object of this invention to provide an aircraft control system, of the type described having, as an integral part thereof, a novel two-dimensional analogue function generator.

It is a still further object of this invention to provide, for use in an aircraft control system, a novel analogue function generator, said function generator being particularly adaptable in the production of functions which cannot be easily expressed mathematically. It is a still further object of this invention to provide a function generator of the type described wherein computing accuracy is maintained with a minimum amount of adjustment.

It is yet another object of this invention to provide a function generator of the type described that is free from drift and is readily adaptable to miniaturization.

Still another object of this invention is to provide, in combination with an aircraft control system, a low cost analog function generator of simple construction having longer life characteristics than those now known in the art.

The above and other objects of this invention will become clearer upon consideration of the following specification taken in connection with the accompanying drawings in which FIGURE 1 illustrates an aircraft runway together with a typical predetermined landing pattern;

FIGURE 3 is a plan view of an aircraft heading function generator, in accordance with one preferred embodiment of my invention;

FIGURE 4 is a section view of FIGURE 3 taken at A—A;

FIGURE 5 is a plan view of an aircraft time-to-go function generator in accordance with said preferred embodiment of my invention;

Referring now to FIGURE 1 in more detail, there is illustrated an aircraft runway with its associated predetermined landing pattern 15. A plurality of heading lines 16 are illustrated as being tangent to said landing pattern 15. Heading lines 16, as shown, are representative of an infinite number of such headings associated with landing pattern 15 and indicate the heading which an aircraft, residing on such a line, should take to conform therewith. Time-to-go lines 17 are illustrated in a similar manner. When an aircraft is located by tracking radar in the proximity of the runway, time-to-go and heading information are processed in accordance with the principles of my invention and instructions derived therefrom are transmitted to the aircraft.

Generally speaking my invention comprehends the combination of an analog function generator (FIGURE 3) that provides, electrically, an exact replica of said runway, landing pattern, and heading lines, an analog function generator (FIGURE 5) that provides, electrically, an exact replica of said runway, landing pattern, and time-to-go lines; radar means adapted to determine the position of an aircraft within the immediate proximity of said runway; apparatus for positioning pick-up means on said function generators in accordance with said position information; means for converting the output of said pick-up head means into aircraft heading directions; and means for transmitting said heading direction to said aircraft.

Figure 2:
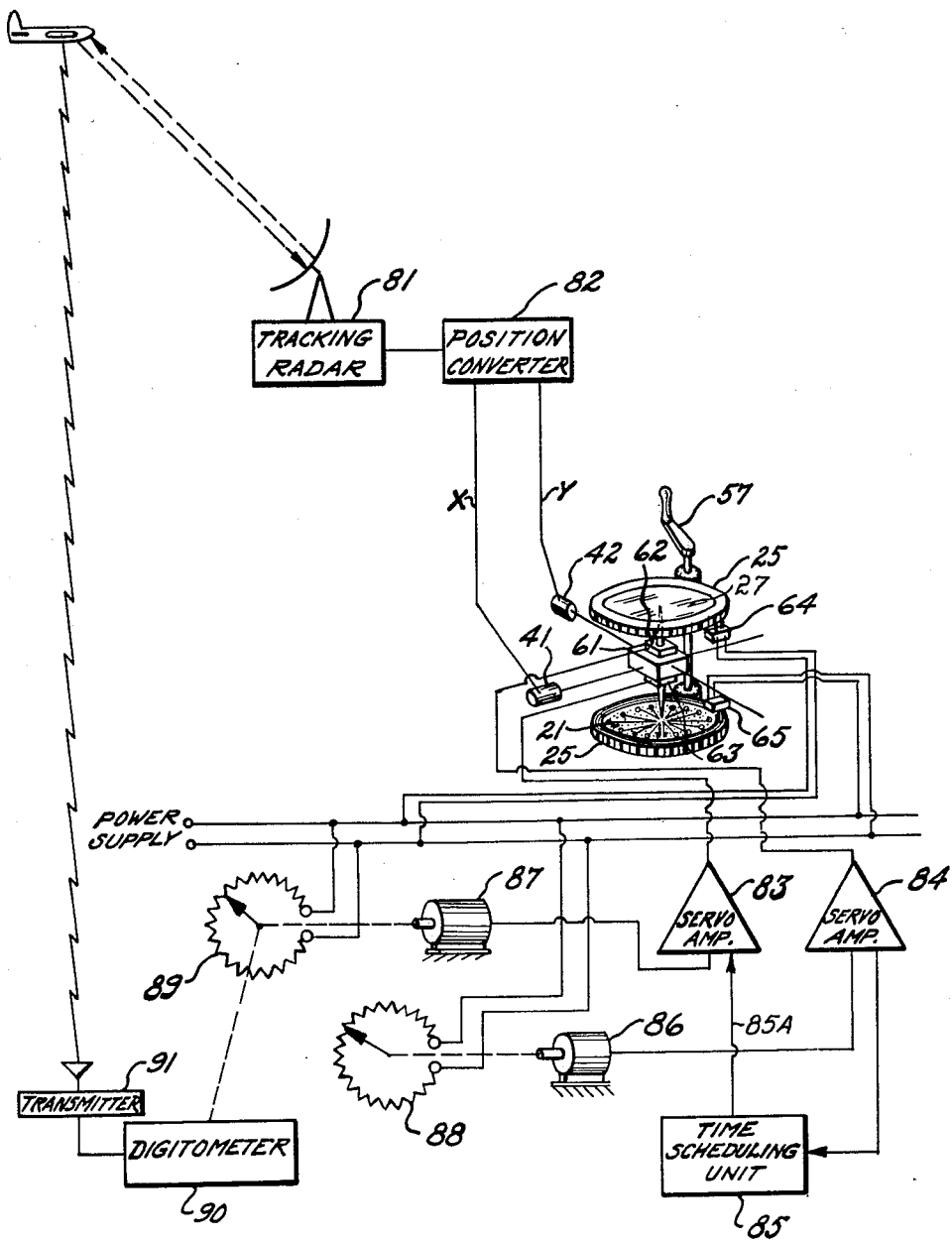
FIGURE 2 is a block diagram of the aircraft control system incorporating the principles of my invention.

Referring now to FIGURE 2, there is disclosed a comprehensive diagram of such a system. In operation, tracking radar 81 detects the position of an approaching aircraft, and relays such position information to position converter 82. Position converter 82 converts the position information into $x$ and $y$ coordinates. Mechanical apparatus is provided to position pick-up heads 62 and 63 on function generators 21 and 27, which apparatus will be described in detail in conjunction with FIGURES 3, 4 and 5. Briefly, said apparatus comprises frame 70, pick-up head carriage 61, pick-up heads 62 and 63, input means 64 and 65, and $x$ and $y$ coordinate position servo motors 41 and 42, as shown. The $x$ and $y$ coordinate information from position converter 82 actuates servo motors 41 and 42, causing them to orient pick-up heads 62 and 63 on function generators 21 and 27 such that they correspond to the actual relative position of said aircraft to said runway. Function generators 21 and 27 are energized from the power supply via input means 64 and 65. The output of time-to-go function generator 27, as detected by pick-up head 62, is amplified by servo amplifier 84 and applied, simultaneously, to time scheduling unit 85 and to potentiometer servo motor 86. Thus, actual time-to-go information is compared with the desired time-to-go by time scheduling unit 85 and is also indicated directly by the pointer of potentiometer 88. The physical position of said pointer is therefore a mechanical representation of the electrical voltage obtained from the surface of function generator 27, and can be transformed into either visual or digital information. Any deviation from desired time-to-go, as observed by time schedule unit 85, is applied as a correction voltage factor via conductor 85A leading to servo amplifier 83, and thence to heading potentiometer servo motor 87. Heading potentiometer servo motor 87 is also actuated by the output of pick-up head 63, which output has been amplified by servo amplifier 83. The output of heading potentiometer 89 is then fed to digitometer 90 wherein the heading commands for the aircraft are digitized for transmission, via transmitter 91, to said aircraft. Since time-to-go information appears in its final form as a correction factor, it is only necessary to transmit heading commands to the aircraft being controlled in order to make it conform to the desired landing pattern.

Figure 6:
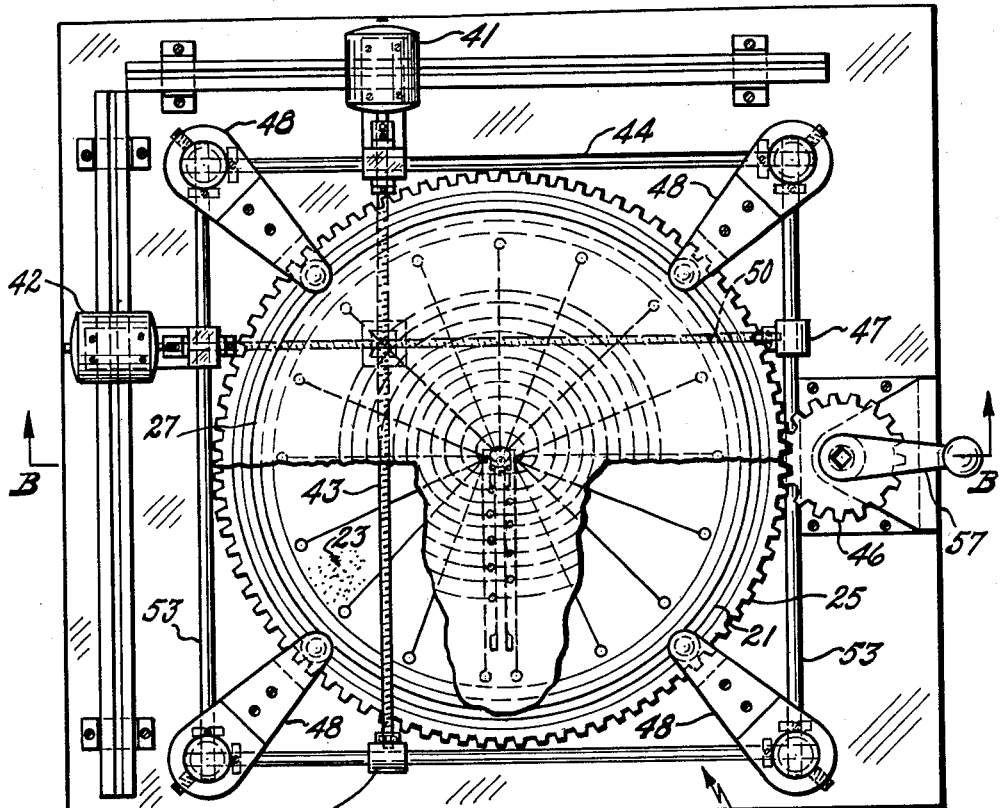
FIGURE 6 illustrates the mechanism associated with said function generators.
Figure 7:
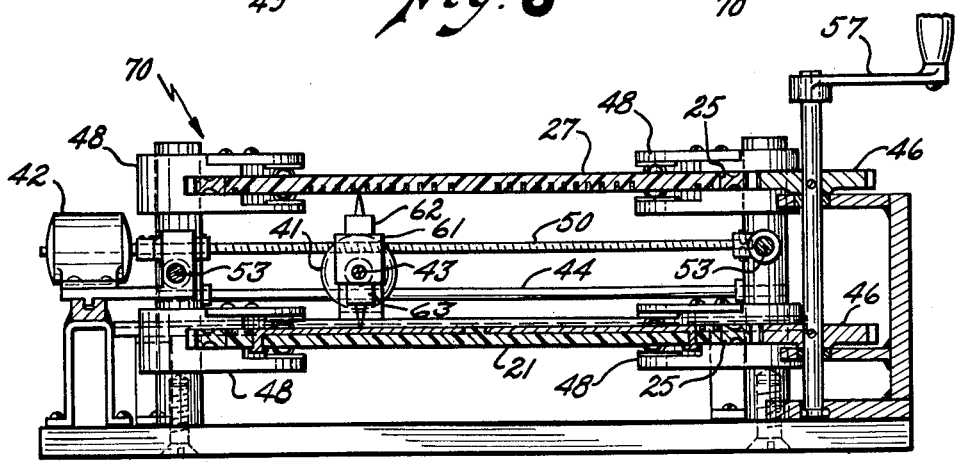
FIGURE 7 is a sectional view of FIGURE 6 taken at B—B.

Referring now to FIGURES 3, 4 and 5, there are illustrated function generators of the type comprehended by my invention. Such a function generator is a memory device which has information stored on a flat card with a resistive coating. The card is electrically excited to represent a two-dimensional plane. The excitation voltage values are entered on the card to constitute a record respective of the operational pattern of the aircraft being controlled. A servo system positions a pick-up head on the card, according to the input information, and the information is read off as a voltage. If several functions are desired, a separate card and pick-up head are needed for each function, each card and pick-up head must be accurately positioned relative to a common reference, and each card properly excited. A single servo system can position the several pick-up heads. The mechanical means for accompanying this is illustrated by FIGURES 6 and 7, and will be described in detail below.

Basically, function generators 21 and 27 of the presently preferred embodiment of my invention comprise copper-clad paper base phenolic laminate cards. However, almost any insulated material, such as fibre glass laminate, lava or ceramic should prove satisfactory. The cards used in said presently preferred embodiment were cut from sheets with a thickness of .0625" and have an outside diameter of 5". The actual thickness, however, is immaterial so long as the mechanical strength is sufficient for the application.

To maintain better accuracy and decrease line sizes, the pattern for excitation was originally drawn several times the size of the card to be used. In the present instance, the radial pattern of card 21 and the concentric circle pattern of card 27 correspond to tangent heading lines 16 and time-to-go lines 17 of FIGURE 1, respectively. Drawing to card size ratio was made to be about 24 to 1. The drawing was reduced photographically to the proper size and the pattern for excitation was etched on the card. The reduction in drawing size also reduces the width of excitation lines 24 and 35; line width of .003 and .004" are readily obtainable by this method. Accuracies of better than 1% can be realized with said 5" card.

Function generator cards 21 and 27 were printed and etched using conventional printed circuit techniques. Both sides were etched; the front side providing the excitation lines and the reverse side locating the points at which electrical connections were made. At the contact points, the card was drilled through so that connection could be made to the electrical field pattern on the front side.

Fundamentally, coating 23 is composed of carton particles acting as a conducting medium, said carbon particles being encased in an insulator binder. The binder holds the carbon particles in a fixed spatial relationship; adheres the coating to the card, and after curing provides a long lasting hard surface. The resistance per square can be changed by varying the thickness of the coating, by varying the ratio of resin to graphite, and by using graphite particles of different sizes.

The resistivity of the epoxide resin and graphite coating varies with the proportion and flake size of the graphite. For most applications a resistance of 100,000 ohms per square is appropriate. After the coating is applied the card is cured and heat cycled a number of times. The cards are alternately heated and cooled from 20° C. to 100° C. to stabilize the resistance value of the card. About an hour is required to reach 100° C. The card is held at this temperature for another hour, and a third hour is required to cool the card to room temperature. Three cycles give the coating good electrical stability; after five cycles the change in resistance is less than 0.5% when the card temperature varies from 20° C. to 70° C.

The pattern for excitation defines the electric field wanted. The coating is homogeneous; the resistivity per unit area is uniform. A linear voltage distribution over the entire surface of the card can easily be obtained. However, most applications may require a non-uniform voltage distribution. For example, distance-to-go function generator 27 has concentric rings 35 of conducting material which define the field pattern. These rings represent loci of constant distance or constant time from the center of the card. As the circumference of the ring becomes longer, the cross sectional area of the resistive coating increases, decreasing the resistance, $$R = P\frac{L}{A}$$

Where $R$ = resistance,
$P$ = resistivity, a constant,
$L$ = length of the path of conduction
$A$ = cross sectional area of the conducting path.

As a practical matter, the geometry is simplified to perfect circles. The circles are concentric and equally spaced; the coating is assumed to be even and homogeneous. Only the cross sectional area increases as the resistance path between circles is considered.

Each circle is individually excited to insure the correct voltage at that range. Although the voltage gradient between two successive circles is not linear, this non-linearity can be minimized by:

(a) Restricting the ratios of diameters of successive or adjacent circles as much as possible. Maximum nonlinearity between circles whose radii are in the ratio 2 to 1 is 8.6%; for radii in the ratio 3 to 2, this error reduces to 5.5%. The percentages are expressed as the maximum deviation from the linear value in percentage of linear difference between circle diameters. For example, if each circle represents 10 miles in range, 10 circles would give the card a range of 100 miles; maximum error, assuming the above nonlinearities between circles, would be 0.86 and 0.55 mile, respectively. Radii of circles farther from the center of the card approach a ratio nearer unity and errors are decreased.

(b) Increasing the number of excitation points. Each excitation point is fixed at the proper voltage. Since the error is between successive circles only, the error can only be a fraction of the difference in the value of the two circles. When this error is expressed relative to the full range of the card, it becomes less significant as additional circles are added, and maximum errors of less than 1% are not unreasonable.

The pattern of concentric circles demonstrates a complex excitation problem; a linear voltage gradient is not readily obtainable. Heading function generator 21 has a very simple excitation pattern. Heading lines 24 being radial and of equal length produce a fairly linear voltage gradient between lines without compensating circuitry. A number of excitation lines are necesary to obtain a stable pattern and these lines are conveniently placed every 15°.

Distance-to-go function generator 27 is appropriate to illustrate the loading technique. In addition to nonlinearities between circles discussed above, the resistance for the coating between adjacent circles decreases as the size of the circles increases.

Figure 8:
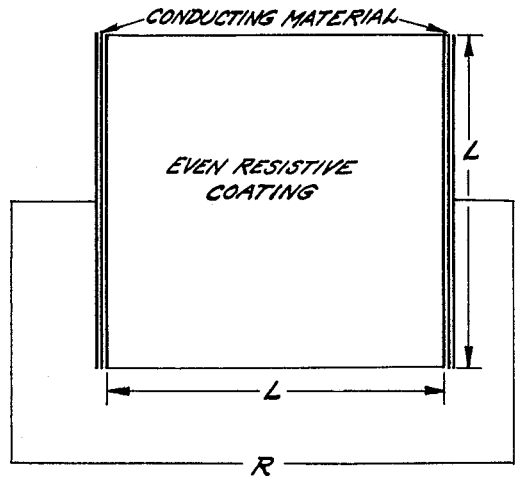
FIGURE 8 illustrates a method of determining unit resistance measurement.

The resistance per square of the coating is defined as the resistance of a unit length of the coating of a unit width, as illustrated in FIGURE 8. Thickness is uniform over the entire area and can be disregarded in the calculation:

$$R = P\frac{L}{L^2} = \frac{P}{L} \approx 100{,}000 \text{ ohms per square}$$

Resistance of the coating is thus expressed without dimensions.

Figure 9:
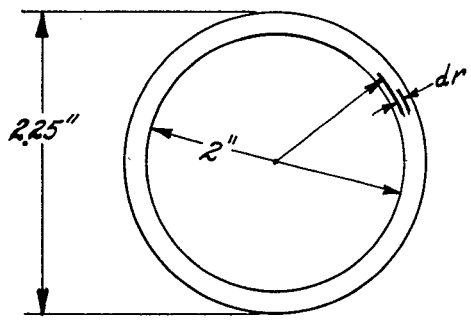
FIGURE 9 illustrates a method of calculating the resistance of successive circles appropriate in the time-to-go function generator.

Concentric circles with increasing diameters are now considered. In FIGURE 9 two successive circles are shown. For this case, $$dR_c = P2\frac{dr}{\pi r}$$

$$R_c = P\frac{1}{2\pi}\int_{r_1}^{r_2}\frac{dr}{r} = P\frac{1}{(2\pi)}\operatorname{lin}\left(\frac{r_2}{r_1}\right)$$

If the circles are considered to be spaced 0.125 inch apart and the inner circle has a radius of 1 inch between two conducting rings, $$R_c = P \frac{1}{2\pi} \ln \frac{1.125}{1}$$

$$= \frac{100{,}000}{2\pi} (0.118) = 1876 \text{ ohms}$$

Calculations for 10 circles were made similarly and the results are shown in Table 1 where $R_c$ is the resistance of the card between circles.

With the resistance of the respective areas known, the card must now be compensated; the resistance between successive rings must be equalized to obtain equal potentials between rings. This is done by loading with precision resistors 31.

The card is heat-cycled to minimize the temperature coefficient of resistance. Heat-cycling also helps to stabilize the precision resistors. An arbitrary resistance value is chosen and the card is compensated to this value. As the loading resistors are to be placed in parallel with the card resistances, a value chosen must be lower than the minimum $R_c$ to be compensated. A good value for this example has been determined to be between 500 and 1,000 ohms. Assuming 500 ohms, the loading resistance is calculated to make the parallel combination of $R_c$ and $R_L$ equal to this value, where $R_L$ is the loading resistance.

$$R_c \| R_L = 500 \text{ ohms}$$

For $R_{c8}$ in Table 1, $$\frac{1876(R_L)}{1876 + R_L} = 500$$

$$R_L = 682 \text{ ohms}$$

*Table 1.—Card resistances for concentric-circle pattern card of FIG. 4*

| | Between Circles | Radius of Smaller Circle (in.) | Ratio of Radii | $R_c$, Ohms | $R_L$, Ohms |
|---|---|---|---|---|---|
| $R_{c1}$ | 1 and 2 | 0.125 | 2.0 | 11,040 | 524 |
| $R_{c2}$ | 2 and 3 | 0.25 | 1.5 | 6,460 | 542 |
| $R_{c3}$ | 3 and 4 | 0.375 | 1.333 | 4,570 | 561 |
| $R_{c4}$ | 4 and 5 | 0.5 | 1.25 | 3,555 | 582 |
| $R_{c5}$ | 5 and 6 | 0.625 | 1.2 | 2,900 | 604 |
| $R_{c6}$ | 6 and 7 | 0.75 | 1.1667 | 2,455 | 628 |
| $R_{c7}$ | 7 and 8 | 0.875 | 1.1428 | 2,120 | 654 |
| $R_{c8}$ | 8 and 9 | 1.0 | 1.125 | 1,876 | 682 |
| $R_{c9}$ | 9 and 10 | 1.125 | 1.1111 | 1,675 | 713 |

Figure 10:
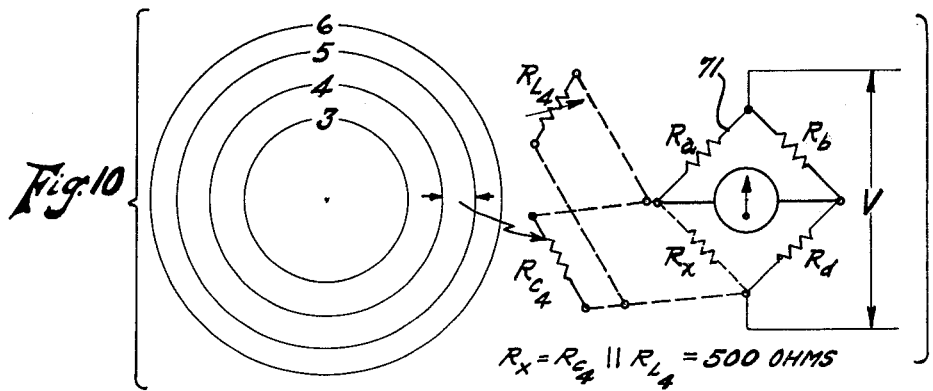
FIGURE 10 illustrates a method for compensating the function generator (bridge method).

The values of the loading resistors 31 can be determined with precision using a resistance bridge and a selection of heat-cycled precision resistors, or a decade resistance box as illustrated by FIGURE 10. The function generator is inserted into the unknown leg of bridge 71 and loading resistance is added in parallel until said bridge balances. If care is used with this method, a function generator can be compensated in about an hour to an accuracy of about 0.1%. After the function generator has been compensated the equivalent circuit of the card consists of a series of equal resistances. If a D.C. voltage is applied to the outermost ring, and the innermost ring is grounded, a linear field is obtained.

The mechanical means for orienting said function generators and pick-up heads is illustrated by FIGURES 6 and 7. Frame 70 is designed to hold function generators 21 and 27 concentrically and parallel to each other. Pick-up head support member 61 is arranged to hold pick-up heads 62 and 63 in juxtaposition between said function generators, as shown in FIGURE 6. Servo motors 41 and 42 being slidably mounted on tracks 53 and 44 turn threaded rods 50 and 43 in response to the $x$ and $y$ position information from position converter 82. Excitation to the function generator is provided through brush contact elements 64 and 65. Each function generator has gearing 25 located on its outer periphery. Manual crank 57 positions the function generators through gearing 25, thereby providing for physical correspondence of the function generator with any desired runway.

While certain preferred embodiments of the invention have thus been specifically disclosed, it is understood that the invention is not limited thereto as many variations will be readily apparent to those skilled in the art; therefore, it is intended that the invention is to be given its broadest possible interpretation within the terms of the following claims.

What I claim is:

1. A function generator for use in an aircraft control system, said function generator comprising first and second function generating components, said first function generating component being in the form of a flat card providing an electrical representation of the desired control pattern, said card having a plurality of heading lines superimposed thereon, and said second function generating component being also in the form of a flat card providing an electrical representation of the desired control pattern, said card having a plurality of distance-to-go lines superimposed thereon, and first and second pick-up heads associated with said first and second function generating components respectively.

2. A function generator as set forth in claim 1 wherein said first function generating component comprises a non-conductive base element divided into sectors, means for electrically exciting said first function generating component, means for providing, on the said sectors of said base element a voltage distribution that is indicative of aircraft heading, and means for providing a linear voltage gradient between successive sectors of said base element surface.

3. A function generator as set forth in claim 2 wherein said non-conductive base element comprises a copper-clad paper-base phenolic laminate disc.

4. A function generator as set forth in claim 3 wherein said means for electrically exciting said first function generating component comprises two concentric conductive excitation strips oriented on the outer periphery of said disc, said excitation strips having power input brushes in contact therewith.

5. A function generator as set forth in claim 4 wherein said means for providing a voltage distribution that is indicative of aircraft heading comprises first and second linear conductive strips disposed on the top surface of said disc, said first linear conductive strip extending from the center line of said disc to one of said excitation strips, and said second linear conductive strip extending from the center line of said disc to the other of said excitation strips, said first and second linear conducting strips being equidistant from the perpendicular bisector of said center line, a plurality of radial conducting strips being disposed at substantially equal angles between said first and second linear conductors, and a surface coating of resistive material, said resistive material being homogeneous and having a resistance of substantially one hundred thousand ohms per square unit.

6. A function generator as set forth in claim 5 wherein said means for providing a linear voltage gradient between successive sectors of said base element surface comprises resistance elements disposed between said radial conducting strips.

7. A function generator as set forth in claim 1 wherein said second function generating component comprises a non-conductive base element divided into sectors, means for electrically exciting said second function generating component, means for providing, on the said sectors of said base element, a voltage distribution that is indicative of the time-to-go condition of said aircraft, and means for providing a linear voltage gradient between successive sectors of said base element surface.

8. A function generator as set forth in claim 7 wherein said non-conductive base element comprises a copper-clad paper-base phenolic laminate disc.

9. A function generator as set forth in claim 8 wherein said means for providing a voltage distribution that is indicative of the time-to-go condition of said aircraft comprises a plurality of concentric circular conductive strips disposed on the top surface of said disc, the innermost and the outermost of said discs being connected to said electrical excitation means, and a surface coating of resistive material, said resistive material being homogeneous and having a resistance of substantially one hundred thousand ohms per square unit.

References Cited by the Examiner

UNITED STATES PATENTS

| | | | |
|---|---|---|---|
| 2,617,587 | 11/52 | Carpenter | 235—197 |
| 2,859,915 | 11/58 | Doll | 235—61.6 |
| 2,876,562 | 3/59 | Steiber | 235—61.6 |
| 2,902,607 | 9/59 | Hedger et al. | 235—61.6 |
| 3,081,454 | 3/63 | Gabelman et al. | 343—6 |

CHESTER L. JUSTUS, *Primary Examiner.*

KATHLEEN CLAFFY, *Examiner.*